(12) United States Patent
Zhao et al.

(10) Patent No.: US 8,599,689 B2
(45) Date of Patent: Dec. 3, 2013

(54) NETWORK QUALITY OF SERVICE UPDATE CONTROL

(75) Inventors: Xiaoming Zhao, Irving, TX (US); Claude Jean Frederic Arzelier, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 183 days.

(21) Appl. No.: 12/544,080

(22) Filed: Aug. 19, 2009

(65) Prior Publication Data
US 2010/0046369 A1 Feb. 25, 2010

Related U.S. Application Data

(60) Provisional application No. 61/091,256, filed on Aug. 22, 2008.

(51) Int. Cl.
H04L 12/26 (2006.01)

(52) U.S. Cl.
USPC .......................................................... 370/232

(58) Field of Classification Search
USPC .................................................. 370/229–236
See application file for complete search history.

(56) References Cited

U.S. PATENT DOCUMENTS

| | | | | |
|---|---|---|---|---|
| 6,088,335 | A * | 7/2000 | I et al. ............................ | 370/252 |
| 6,665,273 | B1 * | 12/2003 | Goguen et al. ................ | 370/252 |
| 7,480,518 | B2 * | 1/2009 | Shintani ........................ | 455/522 |
| 7,925,263 | B2 * | 4/2011 | Zaki .............................. | 455/436 |
| 2003/0053464 | A1 * | 3/2003 | Chen et al. .................... | 370/400 |
| 2004/0097240 | A1 * | 5/2004 | Chen et al. .................... | 455/450 |
| 2005/0083850 | A1 * | 4/2005 | Sin et al. ....................... | 370/252 |
| 2006/0002377 | A1 * | 1/2006 | Skog et al. .................... | 370/352 |
| 2006/0218302 | A1 * | 9/2006 | Chia et al. ..................... | 709/245 |
| 2007/0002868 | A1 * | 1/2007 | Qian et al. ............... | 370/395.21 |
| 2007/0030853 | A1 * | 2/2007 | Rogers et al. ............ | 370/395.21 |
| 2007/0115887 | A1 * | 5/2007 | Baek et al. .................... | 370/331 |
| 2007/0155377 | A1 * | 7/2007 | Horiguchi et al. ......... | 455/422.1 |
| 2008/0219218 | A1 * | 9/2008 | Rydnell et al. ................ | 370/331 |

FOREIGN PATENT DOCUMENTS

| | | |
|---|---|---|
| EP | 1619917 A1 | 1/2006 |
| WO | 0165779 A2 | 9/2001 |
| WO | 2006037361 A1 | 4/2006 |

OTHER PUBLICATIONS

PCT International Search Report; PCT Application No. PCT/US2009/054339; Jan. 4, 2010; 5 pgs.
PCT Written Opinion of the International Searching Authority; PCT Application No. PCT/US2009/54339; Jan. 4, 2010; 9 pgs.
Research in Motion; Title: Used APN-AMBR; Change Request; S2-085808/S2-084866; 3GPP TSG-SA2 Meeting #67; Sophia-Antipolis, France; Aug. 25-29, 2008; 13 pgs.

(Continued)

Primary Examiner — Kwang B Yao
Assistant Examiner — Juvena Loo
(74) Attorney, Agent, or Firm — Conley Rose, P.C.; J. Robert Brown, Jr.

(57) ABSTRACT

A method for communicating in a network is provided. The method comprises identifying a QoS threshold, and determining a difference between a first quality of service (QoS) parameter and a second QoS parameter. The method also comprises comparing the QoS threshold to the difference between the first and second QoS parameters. The method further comprises determining whether to use the second QoS parameter based on the comparison.

28 Claims, 5 Drawing Sheets

(56) References Cited

OTHER PUBLICATIONS

Nokia, et al.; Title: Clarifications and Corrections Related to UE-AMBR and APN-AMBR; Change Request; S2-084764; 3GPP TSG-SA WG2 Meeting #66; Montreal, Canada; Jun. 18, 2008; 31 pgs.

Kazemi, Ramtin, et al.; Title: Three Dimension QoS Deviation Based Scheduling in Adaptive Wireless Networks; International Conference on Advanced Networking and Applications; IEEE; May 1, 2007; pp. 588-595.

3GPP TSG-SA2 Meeting #66; Title: Used APN-AMBR; Change Request S2-084866; Montreal Canada; Jun. 23-27, 2008; 7 pgs.

3GPP TS 23.401 v8.2.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Jun. 2008; 99 pgs. Part 1.

3GPP TS 23.401 v8.2.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Jun. 2008; 83 pgs. Part 2.

Canadian Office Action; Application No. 2,735,043; May 23, 2013; 3 pages.

* cited by examiner

NETWORK QUALITY OF SERVICE UPDATE CONTROL

CROSS-REFERENCE TO RELATED APPLICATIONS

The present application claims priority to U.S. provisional patent application No. 61/091,256, filed Aug. 22, 2008, by Xiaoming Zhao, et al, entitled "Network Quality of Service Update Control", which is incorporated by reference herein as if reproduced in its entirety.

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as desktop computers, set-top boxes, or network nodes and therefore may also be referred to as user equipment "UE" or mobile station (MS). When a UA is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, an LTE ENB, or other such devices that can provide a UA with access to other components in a telecommunications system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
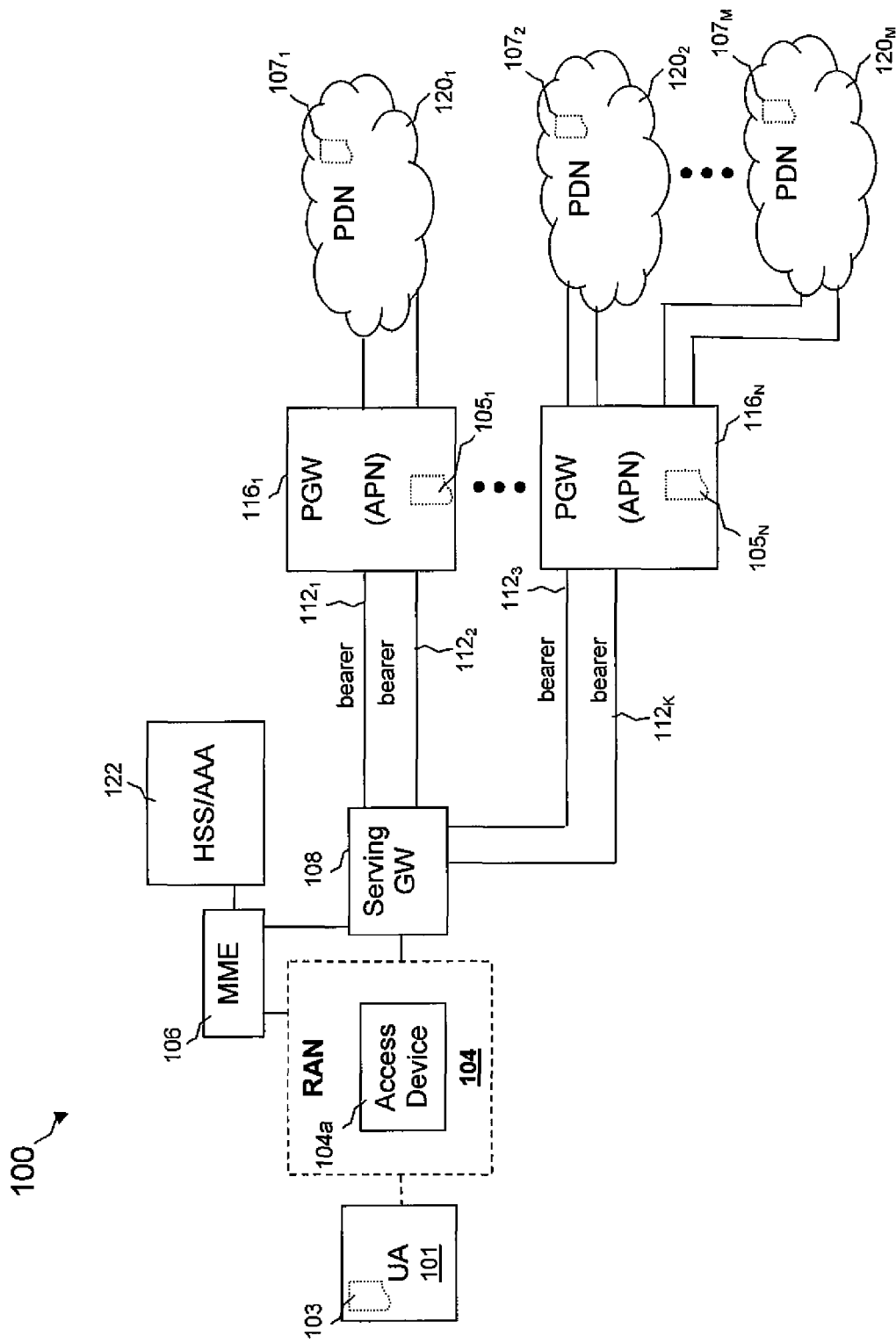
FIG. 1 is an illustration of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method for communicating in a network is provided. The method includes identifying a QoS threshold, and determining a difference between a first or subscribed quality of service (QoS) parameter and a second or adjusted QoS parameter. The method also includes comparing the QoS threshold to the difference between the first and second QoS parameters. The method further includes determining whether to use the second QoS parameter based on the comparison.

In an alternative embodiment, a telecommunication network is provided. The telecommunication network includes a network component configured to compare a quality of service (QoS) threshold to a difference between a first or subscribed QoS parameter and a second or adjusted QoS parameter to determine whether to use the second QoS parameter.

The ability to support scheduling and prioritization of calls, data packets, data streams, bearer traffic, and other events within a telecommunications network to maintain continuity of service may be useful. Certain levels of continuity of service or quality of service (QoS) may be important for certain services such as email, audio, video, or other applications. A given data flow, a required bit rate, delays, and/or bit error rate may be "guaranteed" or agreed upon by a provider. QoS commitments may be challenging to meet if, for example when the network capacity changes, new subscribers (i.e., UAs) are added, or services are accessed, added, or removed from the network. Additionally, managing these QoS commitments may generate excessive network overhead which may degrade the overall quality of service to the subscribers.

QoS management involves frequent updating of QoS parameters of various components in the network, such as packet data network(s) (PDNs), access point name(s) (APNs), packet data gateway(s) (PGWs), UAs, and other network devices or entities. Often, QoS parameters are changed or updated based upon various events, such as a subscriber QoS profile update and/or expiration, a policy and charge control (PCC) rule update by a policy and charge control rule function (PCRF), an Inter Radio Access Technology (RAT) handover, and an addition or removal of a bearer service or packet data network (PDN). Frequent occurrences of these events generate excessive overhead which in turn may degrade network performance.

Under current proposals in an evolved packet system (EPS), QoS parameters are stored in a home subscriber server (HSS) or an authentication, authorization and accounting (AAA) and may be propagated to various network components. In some instances, each of the QoS parameters might be sent by a mobility management entity (MME) to an access network device, the UA, the PGWs, the PCRF, and/or the PDNs. Once received, bearers are established and QoS enforcement may be provided.

Thus it can be seen that network management may entail constant reevaluation of QoS parameters of various network components or systems. These updated QoS parameters are then propagated throughout the network for enforcements and other purposes. However, constantly updating QoS parameters can have an impact on network performance. The present disclosure provides, according to one embodiment, for determining a QoS parameter update threshold (QoS UT). When a QoS parameter of a network component is to be adjusted, for various reasons, a comparison is made to the QoS UT to determine whether or not to make the adjustment. Setting the QoS UT appropriately reduces the implementing minor or unnecessary QoS parameter adjustments and their subsequent propagation throughout the network.

The QoS parameters may include, but are not limited to, Maximum Bit Rate(s) (MBRs), Guaranteed Bit Rate(s) (GBRs), Non-GBR(s), UA-AMBR(s), APN-AMBR(s), PDN-AMBR(s), Allocation and Retention Priority (APRs), QoS Class Indicator(s) (QCIs), and other QoS parameters. The QoS UT may be determined or set by a network operator or by one or more network components. In some embodiments, the QoS UT might be defined as a certain bit rate limit or value. In other embodiments, the QoS UT might define the frequency that a QoS parameter might be updated.

Referring to FIG. 1, illustrated is an embodiment of a telecommunications system 100. FIG. 1 is exemplary and may have other components or arrangements in other embodiments. In an embodiment, the system 100 might be or include an evolved packet system (EPS), or a Global System for Mobile Communication (GSM) Enhanced Data Rates (EDGE) Radio Access Network (GERAN) network, or a Universal Mobile Telecommunications System (UMTS) Terrestrial Radio Access (UTRAN) network or perhaps other networks. The system 100 includes a RAN (radio access network) 104 using a 3GPP evolved UTRAN (EUTRAN or LTE), GERAN or UTRAN network or perhaps other technologies. Internet protocols (IP) IPV4, IPV6, GTP, and/or other current or future protocols may be supported by these technologies. In addition, the RAN 104 may be serviced by any or a combination of Internet Protocol-based networks, packet-based networks, public switched telecom networks (PSTN), and/or integrated services digital networks.

The RAN 104 includes an access network device 104a, such as an evolved Node B, other access devices, or network components. In an embodiment, the RAN 104 is in communication with an EPS mobility management entity (MME) 106. The MME 106 is in communication with a service gateway 108 which communicates through bearers $112_{1-K}$ or signaling connections to packet data gateways (PGWs) $116_{1-N}$. In an embodiment, the PGWs $116_{1-N}$ are associated with access point names (APN). Each of the PGWs $116_{1-N}$ are connected to one or more packet data network(s) (PDN) $120_{1-M}$ which might include non-GBR packet based services such as World Wide Web pages, email and instant messaging services, and other data packet-based services including GBR services.

It should be noted that the lines connecting the elements in FIG. 1 can represent bearer connections, signaling connections, or both. Traditionally, a different style of line is used to represent each type of connection. However, for the sake of clarity in the drawing, bearer connections and signaling connections are both represented by solid lines in FIG. 1. The dashed line connecting the UA 101 to the RAN 104 is intended to represent the fact that the UA 101 might be connected to the RAN 104 at a first time and connected to other systems at other times.

In communication with the RAN 104 is a user agent (UA) 101. In an embodiment, the RAN 104 connects to a radio access cell by which the RAN 104 provides services to the UA 101 via an air interface. In some embodiments, the UA 101 and/or the RAN 104 may include QoS parameter 103.

The PGWs $116_{1-N}$ may include corresponding QoS parameter(s) $105_{1-N}$ including AMBR parameters. The PDNs $120_{1-M}$ may include the corresponding QoS parameters $107_{1-M}$ including AMBR parameters. A QoS AMBR parameter sets up the bandwidth limit for a group of non-GBR bearers for QoS enforcement. The purpose of using AMBRs is to improve network bandwidth resource utilization w.r.t. non-GBR bearer services: e.g. an active non-GBR bearer could utilize the full AMBR bandwidth if no other non-GBR bearers are active. The QoS parameters 103, $105_{1-N}$, and $107_{1-M}$ might be located or shared with systems other than only the UA 101, the PGWs $116_{1-N}$, and the PDNs $120_{1-M}$, respectively, as shown. The QoS parameters 103, $105_{1-N}$, and $107_{1-M}$ and their enforcement may be provided by, stored on, subscribed to or otherwise promoted by the HSS/AAA 122 or other devices within the system 100. In an embodiment, the QoS parameter 103 may correspond to APN-AMBRs or PDN-AMBRs or other QoS parameters. The QoS parameter(s) $105_{1-N}$ may correspond to the APN-AMBRs or PDN-AMBRs or other QoS parameters, and the parameter(s) $107_{1-M}$ might correspond to PDN-AMBRs or other parameters. An APN-AMBR may be used for the QoS enforcement of the non-GBR bearers between the UA 101 and a subscribed APN. An MBR may be used for the QoS enforcement of a GBR bearer between the UA 101 and a subscribed PDN. A PDN-AMBR may be used for the QoS enforcement of the non-GBR bearers between the UA 101 and a subscribed PDN via the associated APN or the PGW.

In some instances, the UA 101 may connect to a plurality of PGWs $116_{1-N}$ and the PDNs $120_{1-M}$ concurrently via for example the access device 104a, the service gateway 108, and the plurality of bearer connections $112_{1-K}$. Based on the UA's 101 quality of service (QoS) profiles, each of the bearers $112_{1-K}$ may conform to a set of quality of service requirements, such as a guaranteed bit rate (GBR), a maximum bit rate (MBR), a packet delay budget (PDB), and other parameters of data transfer quality.

Bearer traffic (represented by the bearers $112_{1-K}$) can be classified into two categories: Guaranteed Bit Rate (GBR) and non-Guaranteed Bit Rate (non-GBR). On a GBR bearer, a specified bandwidth is reserved and remains available as long as the bearer remains in place. A GBR bearer might be established for services with reserved bandwidth requirements, such as voice and video. Services such as email that have more flexible bandwidth requirements might use non-GBR bearers, for which a specified bandwidth is not reserved.

For non-GBR bearers, QoS can be enforced by a QCI, an ARP, a UA-AMBR or UE-AMBR, a MBR, and a PDN-AMBR $107_{1-M}$ for each subscribed PDN $120_{1-M}$ or an APN- AMBR $105_{1-N}$ for each subscribed APN which may be associated with one or more of the PDNs $120_{1-M}$. The QCI, ARP, UA-AMBR, the APN-AMBR, and the PDN-AMBRs may be stored in the UA's QoS profile. When the UA 101 attaches to the network, the MME 106 can retrieve these parameters from a HSS/AAA 122. The UA-AMBR is sent to the access device 104a for down/uplink non-GBR QoS enforcement for the UA 101. The APN-AMBRs $105_{1-N}$ or the PDN-AMBRs $107_{1-M}$ may be sent to the UA 101 for uplink non-GBR QoS enforcement and to the PGWs $116_{1-N}$ for downlink QoS enforcement and uplink QoS enforcement check. The ARP may be used by the network for service bearer allocation and retention. The QCI may be used by the network to specify the bearer classes with corresponding QoS characteristics such as packet drop rate limit and the packet delay budget for the bearer.

The home subscriber server (HSS) or an authentication, authorization and accounting (AAA) server 122 stores policy and tracking/location/routing information for subscribers to a wireless telecommunications service. In an embodiment, the HSS/AAA server 122, or a similar component, can connect to the MME 106 and can store data related to services available to the UA 101, quality of service (QoS) policies for the UA 101, and other similar UA profile data. If dynamic policy and charge control (PCC) rules are to be deployed in the system 100, a policy control and charging rules function (PCRF) (not shown), or a similar component, might be present.

As discussed above, according to one embodiment, a QoS Update Threshold (QoS UT) is provided that is considered when determining whether or not to implement updated a QoS parameter for various network components. As an example, a QoS parameter associated with the UA 101, or UA-AMBR, might be 5 Mbits/sec as a limit to the non-GBRs between the UA 101 and all the active PDNs, and the QoS parameters associated with each of PDNs $120_{1-2}$, or subscribed PDN-AMBRs, might be 3 Mbits/sec each. It can be seen that UA 101 has sufficient subscribed bandwidth to communicate with only one of the networks, such as PDN $120_1$. However, if UA 101 were to simultaneously connect to a second network, such as PDN $120_2$, the two PDNs $120_{1-2}$ would then have a combined total bit rate limit of 6 Mbits/sec, which exceeds the AMBR of the UA 101 of 5 Mbits/sec and may result in packet data loss. To reduce the packet data loss and other inefficiencies created in this instance, the AMBRs of the PDNs 120 might be adjusted, for example, to 2.5 Mbits/sec each for a total of 5 Mbits/sec which aligns with the AMBR of the UA 101 of 5 Mbits/sec. In this case, the new updated AMBRs of the PDNs $120_{1-2}$ of 2.5 Mbits/sec are then propagated to various components in the network for QoS enforcement and for other purposes. This generates network overhead. When multiple components are being constantly reassessed and the resultant updated QoS parameters are then propagated throughout the network, delays may be caused which could degrade network performance.

The present disclosure provides for analyzing the difference between the subscribed and updated QoS parameters. For example, analyzing the difference between the subscribed AMBR or QoS parameter, which is 3 Mbits/sec for either of the two PDNs 120 in the above example, and the updated AMBR or QoS parameter, which is 2.5 Mbits/sec for either of the PDNs 120. In this case, the difference is 0.5 Mbits/sec difference. The present disclosure also provides for implementing the updated QoS parameter where the difference is greater than the QoS UT. For example, if the QoS UT were 1.0 Mbits/sec, the updated QoS parameter of the PDNs 120 of 0.5 Mbits/sec would not be greater than the QoS UT, so the updated QoS parameter would not be implemented. If however the QoS UT were 0.25 Mbits/sec, the updated QoS parameter of 0.5 Mbits/sec of the either of the PDNs 120 would exceed the QoS UT and would therefore be implemented.

It can be seen that, depending upon the value of the QoS UT, the effect is to reduce the number to updated QoS parameters that are implemented and, consequently, reduce the resulting network overhead and delays. Other strategies or techniques for adjusting the QoS parameter(s) based upon the QoS UT to reduce network overhead will readily suggest themselves to one skilled in the art in light of the present disclosure, all of which are within the spirit and scope of the present disclosure. Furthermore, the QoS UT may be set to any value by the network operator or others to promote efficient management of the network. The QoS UT might be updated dynamically or otherwise.

In some embodiments, the QoS UT might include a time component provided to limit the frequency of updates to one or more network components QoS parameters. For example, the time component might be set to 2 minutes. As such, any of the QoS parameters of a component to be adjusted, such as for one of the PDNs 120, might only be allowed to be adjusted or updated when the time period is longer than 2 minutes since last update. In still another embodiment, the QoS UT might restrict the total number of updates per time period. For example, the QoS UT might be limited to not more than 5 updates ever 50 minutes. In this case, where the QoS parameter of a component, such as for one of the PDNs 120, has been updated more than 5 times in 50 minutes, subsequent updates would not be allowed until the expiration of 50 minutes from the first of the 5 most recent updates. Combinations of these embodiments are also contemplated, i.e. restriction of frequency of updates, together with restriction on number of updates per time period.

It should be understood that while the various examples refer to the PDNs 120, the present disclosure may be used to analyze and manage the QoS parameters and updates of any component in the network including, but not limited to PDNs 120, PGW/APNs 116, serving gateways 108, UAs 101, and access devices 104a. It should be further understood that each of the various components in the network, serving gateway 108 for example, may have a QoS parameter associated with that components' own bit rate, for example. Accordingly a corresponding QoS UT would be provided for use in determining when to adjust the QoS parameter for that component. Thus there may be a QoS parameter for serving gateway 108, another for PDN $120_1$, and another for UA 101. Each QoS parameter and device would have an associated QoS UT to be used to determine wither to adjust the corresponding QoS parameter. Also, the various QoS UTs associated with different devices might each have different values.

The QoS parameters and QoS UTs for one or more of the network devices might be stored at various locations, such as the HSS/AAA, MME, or elsewhere, for retrieval and enforcement.

Also, according to the proposal in one embodiment, the present disclosure provides for "tuning" the QoS UT based upon certain statistical metrics including network performance statistics or network performance cost function(s) (e.g., based upon network throughput, retransmission rates, transmission failure, congestion rates, and/or average packet delays). For example, the QoS UT might be tuned so as to reduce the unnecessary QoS adjustments or updates, while also considering whether any given key network performance index (KPI) or KPI set, such as average packet delays and so on, are (and will stay) within given tolerance value(s) if the adjustment or update is not implemented. The tuning of QoS UT can be off-line and/or on-line using certain network statistical metrics and may be implemented by the network operator or others.

The present disclosure has discussed comparing the QoS threshold to the difference between the subscribed and adjusted QoS parameters to determine whether to use the adjusted QoS parameter. However the present disclosure is not so limited. For example, once an adjusted QoS parameter is used, subsequent comparisons would evaluate the adjusted QoS parameter relative to a newly proposed adjusted QoS parameter. In that case the comparison of the QoS threshold would be based on the difference between the previously adjusted QoS parameter and the newly proposed QoS parameter. Therefore the current proposal may be considered, according to one embodiment, as comparing a quality of service (QoS) threshold to a difference between a first QoS parameter and a second QoS parameter to determine whether to use the second QoS parameter.

Figure 2:
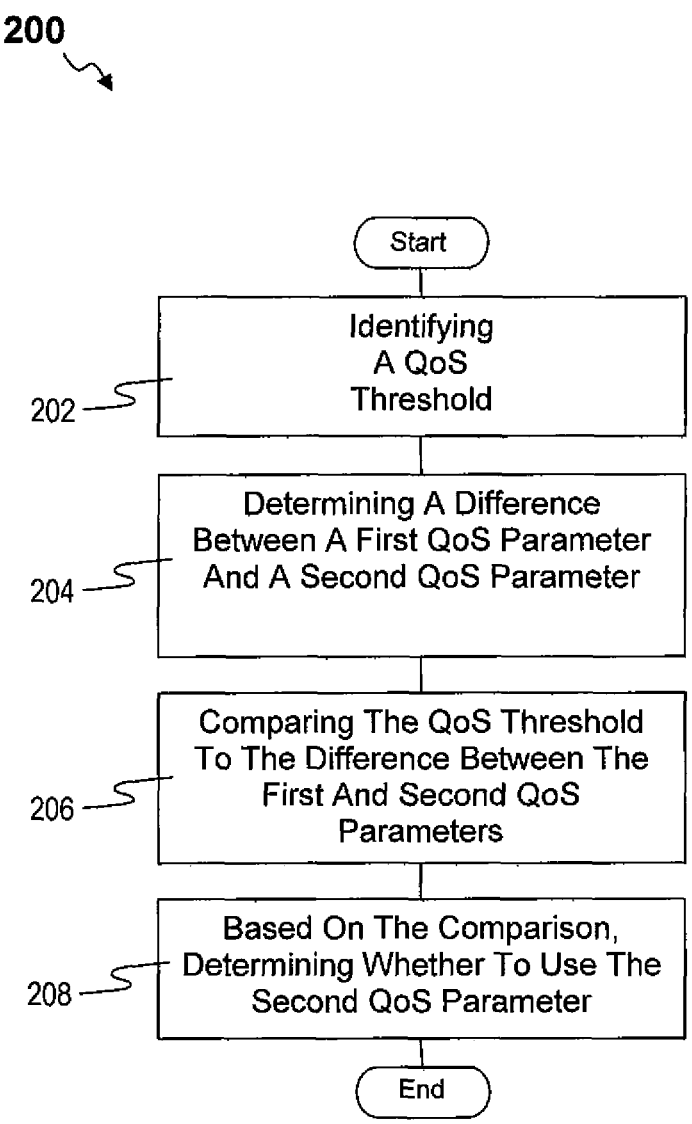
FIG. 2 is a flow chart of a method for communicating in a network according to an embodiment of the disclosure.

FIG. 2 illustrates an embodiment of a method 200 for communicating in a network. At block 202, the method provides for identifying a QoS threshold. At block 204, the method provides for determining a difference between a subscribed QoS parameter and an adjusted b QoS parameter. At block 206, the method provides for comparing the QoS threshold to the difference between the subscribed and adjusted QoS parameter.

At block 208, based upon the comparison the method provides for determining whether to use the adjusted QoS parameter. FIG. 2 is exemplary and other flow charts and procedures could be used.

Figure 3:
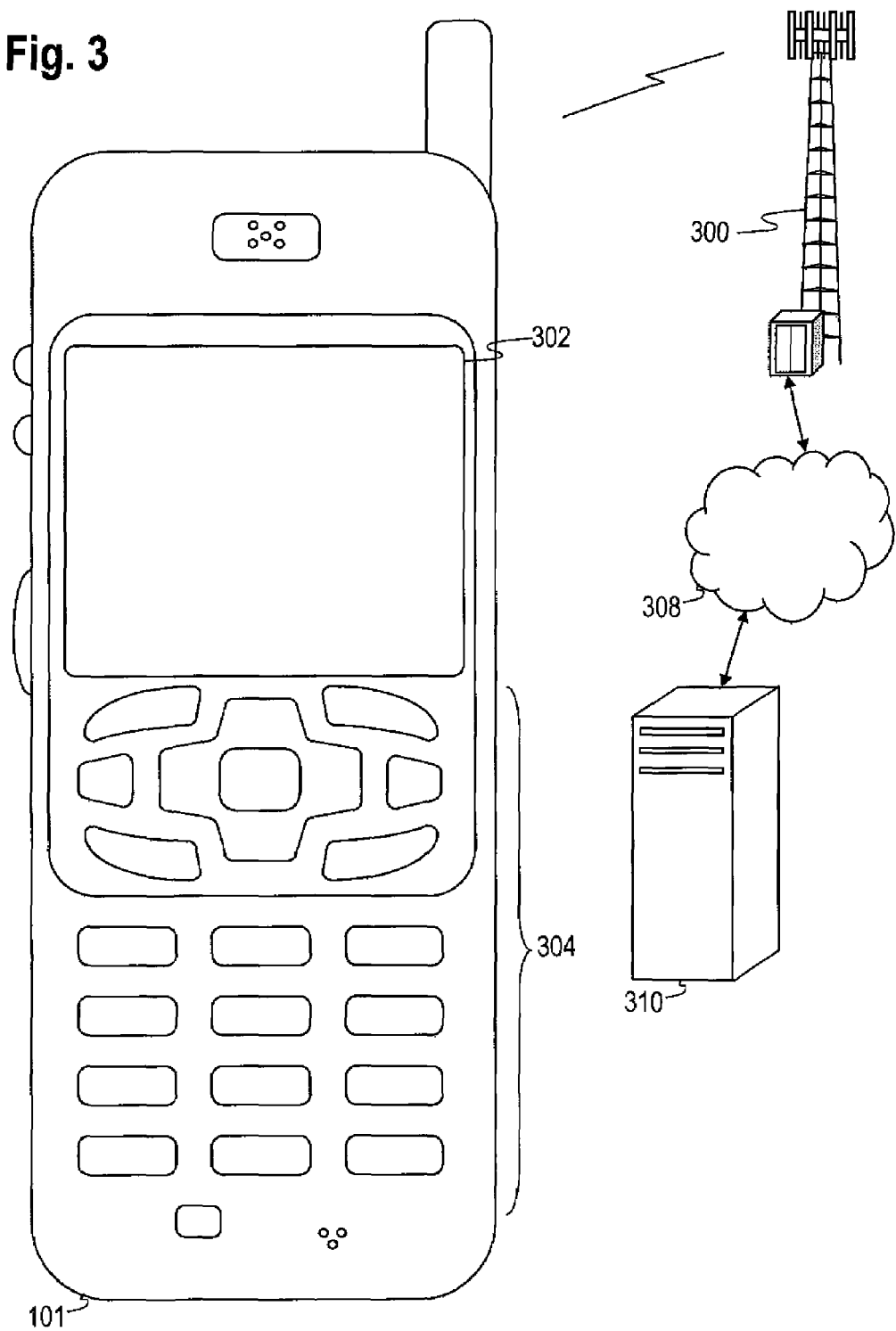
FIG. 3 is a diagram of a wireless communications system including a user agent operable for some of the various embodiments of the disclosure.

FIG. 3 illustrates a wireless communications system including an embodiment of the UA 101. The UA 101 is operable for implementing aspects of the disclosure, but the disclosure should not be limited to these implementations. Though illustrated as a mobile phone, the UA 101 may take various forms including a wireless handset, a pager, a personal digital assistant (PDA), a portable computer, a tablet computer, or a laptop computer. Many suitable devices combine some or all of these functions. In some embodiments of the disclosure, the UA 101 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 101 may be a portable, laptop or other computing device. The UA 101 may support specialized activities such as gaming, inventory control, job control, and/or task management functions, and so on.

The UA 101 includes a display 302. The UA 101 also includes a touch-sensitive surface, a keyboard or other input keys generally referred as 304 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 101 may present options for the user to select, controls for the user to actuate, and/or cursors or other indicators for the user to direct.

The UA 101 may further accept data entry from the user, including numbers to dial or various parameter values for configuring the operation of the UA 101. The UA 101 may further execute one or more software or firmware applications in response to user commands. These applications may configure the UA 101 to perform various customized functions in response to user interaction. Additionally, the UA 101 may be programmed and/or configured over-the-air, for example from a wireless base station, a wireless access point, or a peer UA 101.

Among the various applications executable by the UA 101 are a web browser, which enables the display 302 to show a web page. The web page may be obtained via wireless communications with a wireless network access node, a cell tower, a peer UA 101, or any other wireless communication network or system 300. The network 300 is coupled to a wired network 308, such as the Internet. Via the wireless link and the wired network, the UA 101 has access to information on various servers, such as a server 310. The server 310 may provide content that may be shown on the display 302. Alternately, the UA 101 may access the network 300 through a peer UA 101 acting as an intermediary, in a relay type or hop type of connection.

Figure 4:
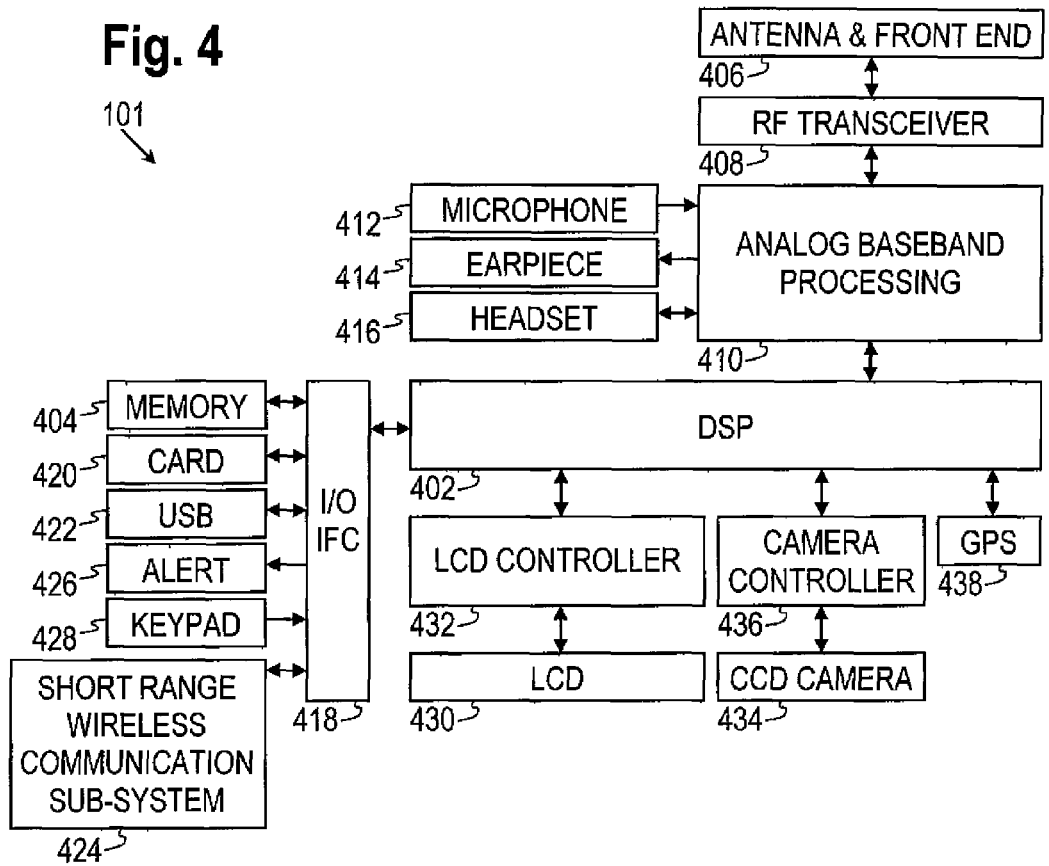
FIG. 4 is a block diagram of a user agent operable for some of the various embodiments of the disclosure.

FIG. 4 shows a block diagram of the UA 101. While a variety of known components of UAs 101 are depicted, in an embodiment a subset of the listed components and/or additional components not listed may be included in the UA 101. The UA 101 includes a digital signal processor (DSP) 402 and a memory 404. As shown, the UA 101 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, a short range wireless communication sub-system 424, an alert 426, a keypad 428, a liquid crystal display (LCD), which may include a touch sensitive surface 430, an LCD controller 432, a charge-coupled device (CCD) camera 434, a camera controller 436, and a global positioning system (GPS) sensor 438. In an embodiment, the UA 101 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the UA 101 in accordance with embedded software or firmware stored in memory 404 or stored in memory contained within the DSP 502 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the UA 101 to send and receive information from a cellular network or some other available wireless communications network or from a peer UA 101. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF Transceiver 408, portions of the Antenna and Front End 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece 414 and the headset 416. To that end, the analog baseband processing unit 410 may have ports for connecting to the built-in microphone 412 and the earpiece speaker 414 that enable the UA 101 to be used as a cell phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the short range wireless communication sub-system 424. The USB interface 422 may be used to charge the UA 101 and may also enable the UA 101 to function as a peripheral device to exchange information with a personal computer or other computer system. The short range wireless communication sub-system 424 may include an infrared port, a Bluetooth interface, an IEEE 802.11 compliant wireless interface, or any other short range wireless communication sub-system, which may enable the UA 101 to communicate wirelessly with other nearby wireless devices and/or wireless base stations.

The input/output interface 418 may further connect the DSP 402 to the alert 426 that, when triggered, causes the UA 101 to provide a notice to the user, for example, by ringing, playing a melody, or vibrating. The alert 426 may serve as a mechanism for alerting the user to any of various events such as an incoming call, a new text message, and an appointment reminder by silently vibrating, or by playing a specific pre-assigned melody for a particular caller.

The keypad 428 couples to the DSP 402 via the interface 418 to provide one mechanism for the user to make selections, enter information, and otherwise provide input to the UA 101. The keyboard 428 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 430, which may include touch screen capability and also display text and/or graphics to the user. The LCD controller 432 couples the DSP 402 to the LCD 430.

The CCD camera 434, if equipped, enables the UA 101 to take digital pictures. The DSP 402 communicates with the CCD camera 434 via the camera controller 436. In another embodiment, a camera operating according to a technology other than Charge Coupled Device cameras may be employed. The GPS sensor 438 is coupled to the DSP 402 to decode global positioning system signals, thereby enabling the UA 101 to determine its position. Various other peripherals may also be included to provide additional functions, e.g., radio and television reception.

Figure 5:
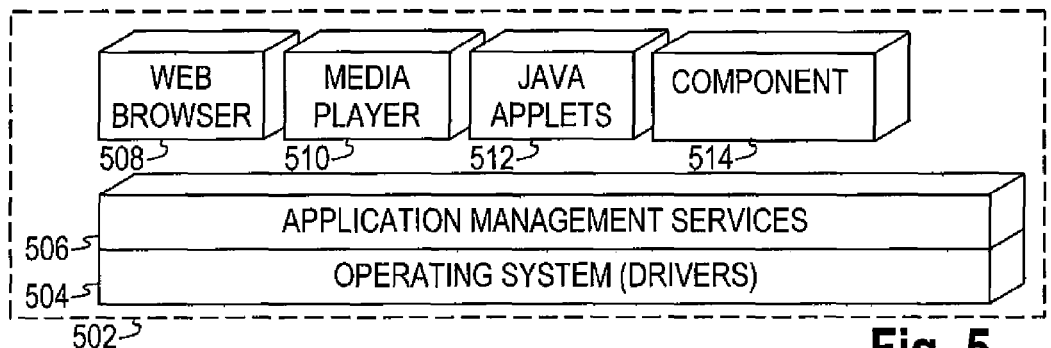
FIG. 5 is a diagram of a software environment that may be implemented on a user equipment operable for some of the various embodiments of the disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the UA hardware with standardized interfaces that are accessible to application software. The operating system drivers 504 include application management services ("AMS") 506 that transfer control between applications running on the UA 101. Also shown in FIG. 5 are a web browser application 508, a media player application 510, and Java applets 512. The web browser application 508 configures the UA 101 to operate as a web browser, allowing a user to enter information into forms and select links to retrieve and view web pages. The media player application 510 configures the UA 101 to retrieve and play audio or audiovisual media. The Java applets 512 configure the UA 101 to provide games, utilities, and other functionality. A component 514 might provide functionality described herein. Although shown at an application layer, the component 514 might be provided at various layers within the environment 502 or elsewhere on the UA 101.

Figure 6:
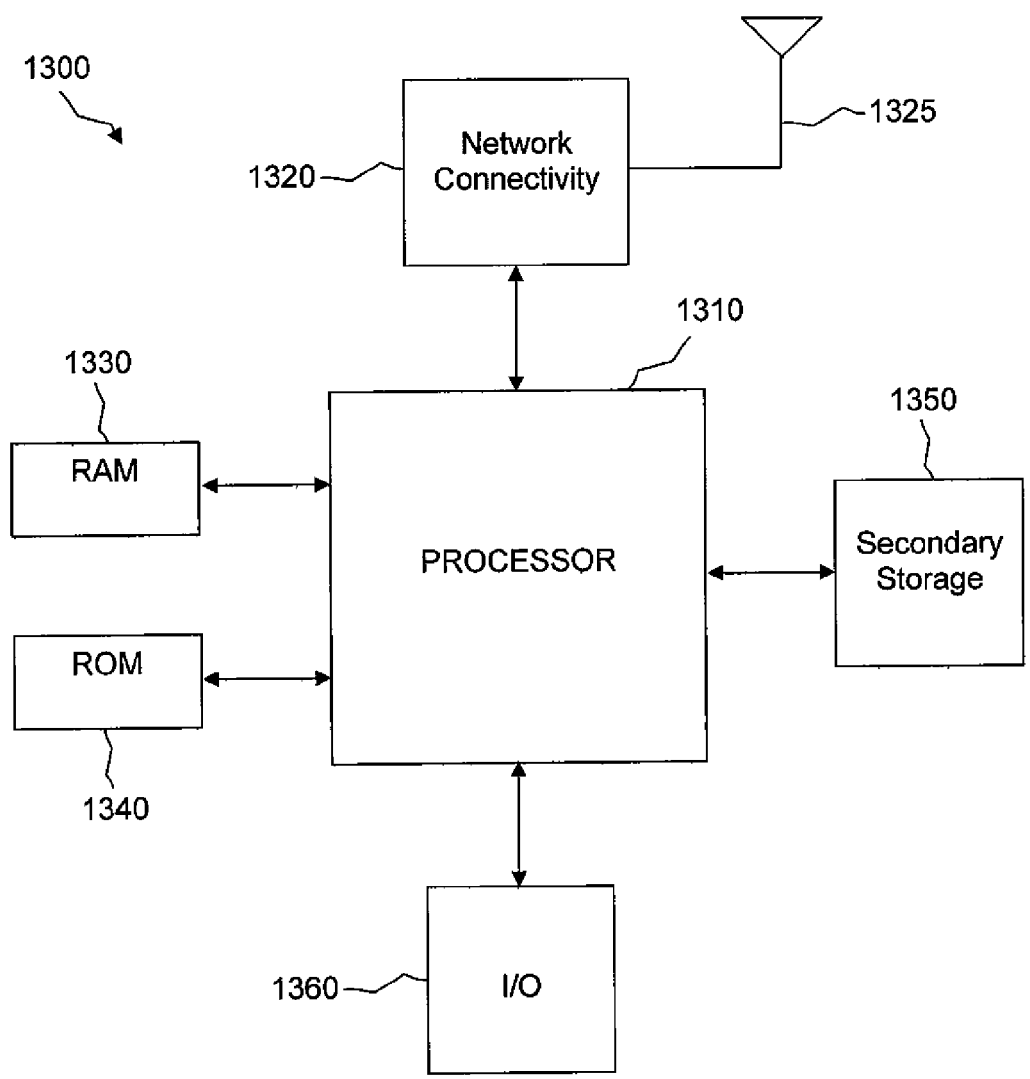
FIG. 6 illustrates an exemplary general-purpose computer system suitable for implementing the several embodiments of the present disclosure.

The UA 101 and other components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, WiFi, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 101, such as the display 402 and the input 404.

The following 3rd Generation Partnership Project (3GPP) Technical Specifications (TS) are incorporated herein by reference for all purposes: TS 23.401 and 3GPP S2-084866.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communicating in a network, comprising:
    identifying a QoS threshold;
    determining, by a network component, a whether a difference between a first quality of service (QoS) parameter and a second QoS parameter exceeds the QoS threshold, wherein the network component is configured to utilize the first QoS parameter at the time the determination is made; and
    re-configuring the network component to utilize the second QoS parameter when the difference between the first QoS parameter and the second QoS parameter exceeds the QoS threshold,
    wherein if the difference between the first QoS parameter and the second QoS parameter does not exceed the QoS threshold, then the network component continues to use the first QoS parameter,
    wherein the first and second QoS parameters include one or more of a maximum bit rate, a guaranteed bit rate, a user agent (UA) aggregate maximum bit rate (AMBR), and an access point name (APN) AMBR.

2. The method of claim 1, wherein the first QoS parameter is a subscribed QoS parameter, and wherein the second QoS parameter is an adjusted QoS parameter, and wherein the subscribed QoS parameter and the adjusted QoS parameter are associated with the network component.

3. The method of claim 1, wherein the network component is one of a user agent (UA), an access device, a service gateway, a packet data gateway, an access point name, and a packet data network.

4. The method of claim 1, wherein the network is one of an evolved packet system (EPS) network, a Global System for Mobile Communication (GSM) Enhanced Data Rates (EDGE) Radio Access Network (GERAN) network, a Universal Mobile Telecommunications System (UMTS) Terrestrial Radio Access (UTRAN) network, WiFi network, and WiMAX network.

5. The method of claim 2, further comprising storing the QoS threshold in a home subscription server (HSS)/authentication, authorization, accounting (AAA).

6. The method of claim 2, further comprising storing the QoS threshold in the network component.

7. The method of claim 6, where the network component is a policy and charge control rule function (PCRF).

8. The method of claim 2, wherein the QoS threshold is configurable by a network operator either on-line dynamically or off-line determination.

9. The method of claim 2, further comprising tuning the QoS threshold based on at least one of, but not limited to: network performance statistics, throughput, retransmission rates, transmission failure, congestion rates, average packet delay.

10. The method of claim 2, wherein when the difference between the subscribed and adjusted QoS parameters is about equal to or greater than the QoS threshold, updating to use the adjusted QoS parameter, and when the difference between the subscribed and adjusted QoS parameters is about less than the QoS threshold, not updating to use the adjusted QoS parameter.

11. The method of claim 2, further comprising considering a time component to determine whether to implement the adjusted QoS parameter.

12. The method of claim 11, wherein the time component is a time duration and wherein the adjusted QoS parameter is not used where the network was updated with a previous adjusted QoS parameter within the time duration.

13. The method of claim 11, further comprising determining the total number of previous QoS parameter adjustments that have been made within a given time duration when considering whether to implement the next QoS parameter adjustment or update.

14. A telecommunication network, comprising:
a network component configured to:
compare a quality of service (QoS) threshold to a difference between a first QoS parameter and a second QoS parameter, wherein the network component communicates using the first QoS parameter prior to making the comparison; and
communicate using the second QoS parameter subsequent to making the comparison when the QoS threshold exceeds the difference between the first QoS parameter and the second QoS parameter,
wherein if the difference between the first QoS parameter and the second QoS parameter does not exceed the QoS threshold, then the network component continues to use the first QoS parameter subsequent to making the comparison,
wherein the first and second QoS parameters include one or more or a maximum bit rate, a guaranteed bit rate, a user agent (UA) aggregate maximum bit rate (AMBR), and an access point name (APN) AMBR.

15. The network of claim 14, wherein the first QoS parameter is a subscribed QoS parameter, and wherein the second QoS parameter is an adjusted QoS parameter, and wherein the subscribed QoS parameter and the adjusted QoS parameter are associated with the network component.

16. The network of claim 14, wherein the network component is one of a user agent (UA), an access device, a service gateway, an packet data gateway, an access point name, and a packet data network.

17. The network of claim 14, wherein the network is one of an evolved packet system (EPS) network, a Global System for Mobile Communication (GSM) Enhanced Data Rates (EDGE) Radio Access Network (GERAN) network, a Universal Mobile Telecommunications System (UMTS) Terrestrial Radio Access (UTRAN) network, WiFi network and WiMAX network.

18. The network of claim 15, further comprising storing the QoS threshold in a home subscription server (HSS)/authentication, authorization, accounting (AAA).

19. The network of claim 15, further comprising storing the QoS threshold in the network component.

20. The network of claim 19, where the network component is a policy and charge control rule function (PCRF).

21. The network of claim 15, wherein the QoS threshold is configurable by a network operator either on-line dynamically or off-line determination.

22. The network of claim 15, further configured to tune the QoS threshold based on at least one of, but not limited to: network performance statistics, throughput, retransmission rates, transmission failure, congestion rates, average packet delay.

23. The network of claim 15, wherein when the difference between the subscribed and adjusted QoS parameters is about equal to or greater than the QoS threshold, updating to use the adjusted QoS parameter, and when the difference between the subscribed and adjusted QoS parameters is about less than the QoS threshold, not updating to use the adjusted QoS parameter.

24. The network of claim 15, wherein the network component is further configured to consider a time component to determine whether to implement the adjusted QoS parameter.

25. The network of claim 24, wherein the time component is a time duration and wherein the QoS parameter adjustment is not implemented where the network was updated with a previous adjusted QoS parameter within the time duration.

26. The network of claim 24, wherein the network component is further configured to determine the total number of previous QoS parameter adjustments that have been made within the time duration when considering whether to implement the next QoS parameter adjustment.

27. The method of claim 1, wherein the QoS threshold comprises a non-zero value.

28. The network of claim 14, wherein the QoS threshold comprises a non-zero value.

* * * * *

UNITED STATES PATENT AND TRADEMARK OFFICE
CERTIFICATE OF CORRECTION

PATENT NO.      : 8,599,689 B2
APPLICATION NO. : 12/544080
DATED           : December 3, 2013
INVENTOR(S)     : Xiaoming Zhao et al.

It is certified that error appears in the above-identified patent and that said Letters Patent is hereby corrected as shown below:

In the Claims:

Claim 1, Column 12, Line 50, replace "a whether" with --"whether"--

Claim 16, Column 14, Line 15, "an packet" should be changed to --"a packet"--

Signed and Sealed this
Twenty-fifth Day of March, 2014

Michelle K. Lee
*Deputy Director of the United States Patent and Trademark Office*